US012242623B2

(12) United States Patent
Lajeunesse et al.

(10) Patent No.: US 12,242,623 B2
(45) Date of Patent: Mar. 4, 2025

(54) SECURE THREE-DIMENSIONAL PRINT FILES

(71) Applicant: MARKFORGED, INC., Watertown, MA (US)

(72) Inventors: Nicholas Peter Lajeunesse, Hollis, NH (US); David Steven Benhaim, Cambridge, MA (US); Arthur Edward Plummer, Quincy, MA (US)

(73) Assignee: MARKFORGED, INC., Waltham, MA (US)

( * ) Notice: Subject to any disclaimer, the term of this patent is extended or adjusted under 35 U.S.C. 154(b) by 338 days.

(21) Appl. No.: 17/840,514

(22) Filed: Jun. 14, 2022

(65) Prior Publication Data
US 2022/0398335 A1 Dec. 15, 2022

Related U.S. Application Data

(60) Provisional application No. 63/210,106, filed on Jun. 14, 2021.

(51) Int. Cl.
G06F 21/62 (2013.01)
G06F 21/10 (2013.01)
G06F 21/31 (2013.01)
G06F 21/60 (2013.01)

(52) U.S. Cl.
CPC .......... *G06F 21/6209* (2013.01); *G06F 21/10* (2013.01); *G06F 21/31* (2013.01); *G06F 21/608* (2013.01)

(58) Field of Classification Search
CPC ...... G06F 21/6209; G06F 21/10; G06F 21/31; G06F 21/608

USPC ........................................................ 726/17
See application file for complete search history.

(56) References Cited

U.S. PATENT DOCUMENTS

| 4,181,429 | A | * | 1/1980 | Batchelor | G03G 15/55 399/367 |
| 2004/0205333 | A1 | * | 10/2004 | Bjorkengren | G06F 21/10 713/153 |
| 2013/0235412 | A1 | * | 9/2013 | Baldwin | G06F 3/1238 358/1.14 |
| 2014/0020192 | A1 | * | 1/2014 | Jones | A43B 13/14 12/146 B |

(Continued)

Primary Examiner — Jacob Lipman
(74) Attorney, Agent, or Firm — Lando & Anastasi, LLP

(57) ABSTRACT

A system is provided for securely performing 3D printing. The system includes: (a) computing equipment configured to: (1) display a list of items available for 3D printing to a user; (2) receive a selection from the user of a particular item; (3) authenticate an acquisition of the particular item by the user; and (4) send, to a 3D printer of the user, a secure 3D print file that includes a description of 3D geometry of the particular item, a description of access restrictions for 3D printing of the particular item, and secure access controls preventing unauthorized access to 3D printing of the particular item; and (b) the 3D printer configured to: (1) authenticate that the user has acquired the particular item and validate that the access restrictions for 3D printing of the particular item do not restrict 3D printing of the particular item by the 3D printer; and (2) in response to authenticating and validating, construct the particular item using the description of 3D geometry of the particular item.

11 Claims, 8 Drawing Sheets

(56) References Cited

U.S. PATENT DOCUMENTS

2018/0300491 A1* 10/2018 Leach ................... G06F 21/10
2019/0121989 A1* 4/2019 Mousseau ............... H04W 4/70

* cited by examiner

SECURE THREE-DIMENSIONAL PRINT FILES

BACKGROUND

Techniques for three-dimensional (3D) printing include subtractive manufacturing and additive manufacturing. Both subtractive manufacturing and additive manufacturing use program instructions and/or object models encoded in print files. A 3D printer reads a print file and prints a 3D object (also referred to herein as a "part") according to the instructions and/or model(s) encoded in that file. Some non-limiting examples of print file formats used by 3D printers include Markforged Print (MFP), STL, OBJ, AMF, 3MF, IGES or IGS, and STEP. In some cases, program instructions and/or models for 3D printing are produced based on computer-aided drafting (CAD) design files.

In subtractive manufacturing, 3D objects are manufactured by cutting away material from an initial block (or other shape) of material. For example, computer numeric controlled (CNC) machines may be initialized and tuned by an operator to create a particular object. The operator may supply a program (e.g., using G-code) that instructs the machine how to make the object. An input material larger than the desired object is provided to the machine. The machine's tool (or multiple tools, depending on the machine) carves away the material, according to the program, to reveal the shape of the specified object.

In additive manufacturing, 3D objects are manufactured by adding layer-upon-layer of material. For example, based on a digital model of a 3D object, an additive manufacturing based 3D printing device can create the object by depositing a part material along toolpaths in a layer-by-layer manner. A print head of the 3D printing device or system carries a nozzle, which deposits the part material as a sequence of roads on a substrate in a build plane. The deposited part material fuses to previously deposited part material and is then solidified. The position of the print head relative to the substrate is then incremented along one or more print axes, and the process can then be repeated to form a 3D object resembling the 3D computer model.

Approaches described in this section have not necessarily been conceived and/or pursued prior to the filing of this application. Accordingly, unless otherwise indicated, approaches described in this section should not be construed as prior art.

TECHNICAL FIELD

The present disclosure relates generally to security in three-dimensional printing.

BRIEF DESCRIPTION OF THE DRAWINGS

Various aspects of at least one embodiment are discussed below with reference to the accompanying Figures, which are not intended to be drawn to scale. The Figures are included to provide illustration and a further understanding of the various aspects and embodiments, and are incorporated in and constitute a part of this specification, but are not intended to define the limits of the disclosure. In the Figures, each identical or nearly identical component that is illustrated in various Figures is represented by a like numeral. For the purposes of clarity, some components might not be labeled in every figure. In the Figures.

DETAILED DESCRIPTION

Figure 1:
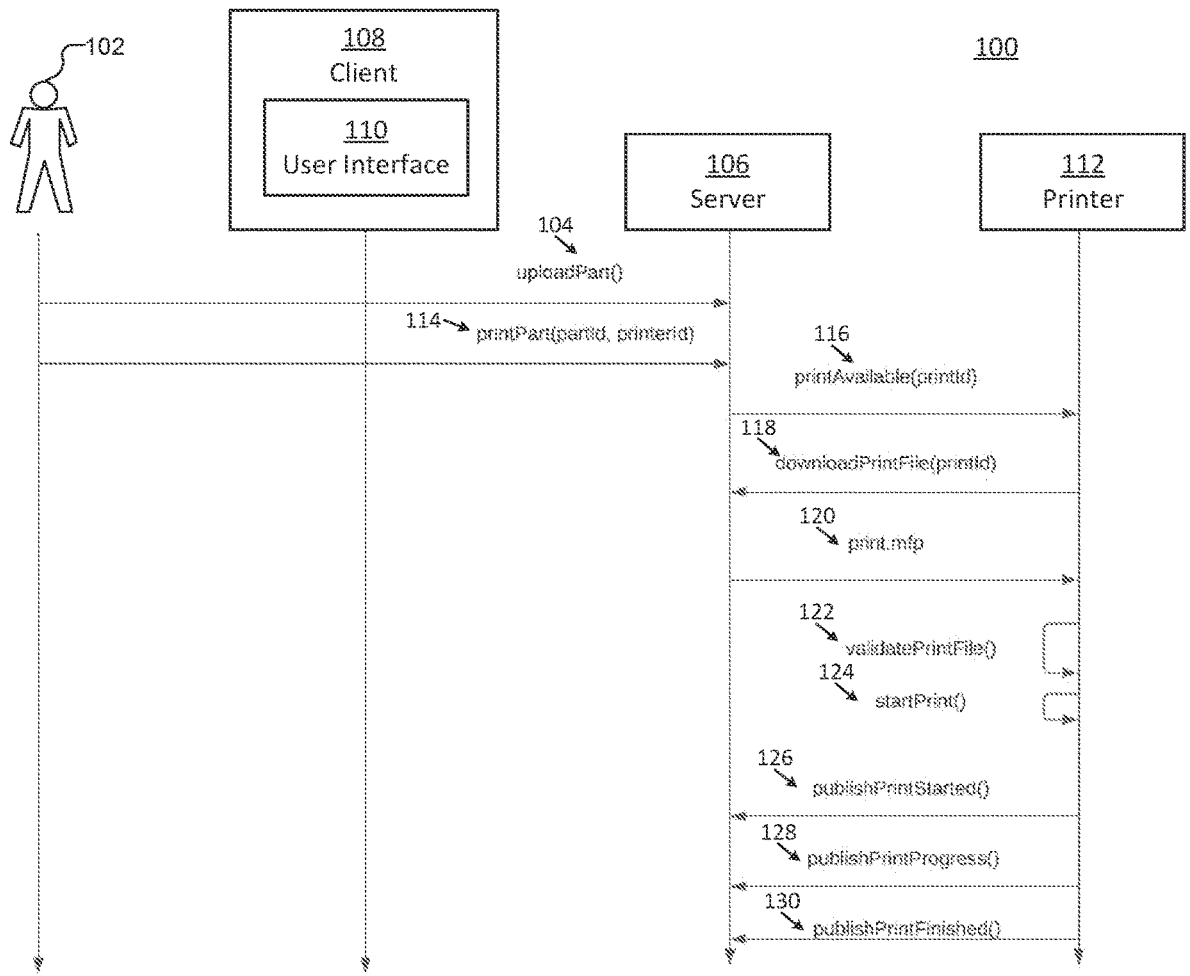
FIG. 1 is a diagram of an example of operations for 3D printing according to one or more embodiments.

In general, 3D print files lack strict access controls. Whoever has a print file can use it whenever or wherever they want to print the object specified by that file. The absence of access controls introduces various usability and security concerns. For example, a system administrator may find it challenging to validate that print technicians are (1) using the most updated version of a print file corresponding to a particular object and/or (2) authorized to print that object. A print file may be intended for use by only a limited or restricted set of one or more users, based for example on export law, International Traffic in Arms Regulations (ITAR), a privacy policy, a customer request, confidentiality, etc. In addition, without access controls on a print file, there is a risk that somebody could exfiltrate the print file and steal intellectual property, which may present a legal and/or financial risk for both the originating company and the company receiving the exfiltrated print file.

One or more embodiments include a 3D print file format with access controls. In addition, one or more embodiments distribute authorization checks and logic to different entities, as needed, to validate a print.

In the discussion herein, examples are provided in the context of 3D printing and additive manufacturing more particularly. However, techniques described herein are not limited to additive manufacturing or 3D printing. Techniques described herein may be extended to other forms of manufacturing, and the concept of a "print file" may be extended to other kinds of part/design manufacturing specifications. For example, techniques described herein may be used to administer access controls for a set of CNC router instructions. In general, techniques described herein may be used to administer access control for part/design manufacturing specifications in a wide range of manufacturing processes.

Techniques described herein allow the rights holder of a print file to authorize other entities (e.g., one or more specific organizations and/or users) to produce the object specified by the print file, while maintaining control of those rights. A secure 3D print file format may provide one or more of the following features.

1. The ability to add authentication and authorization checks for an individual print.
2. Allowing system administrators to create rulesets that provide them with the flexibility to manage print files.
3. Granular control over internal (i.e., within an organization) access to print files.

4. The ability to create a distributed supply chain with access controls outside of the originating organization, as discussed in further detail below.
5. Allowing customers to manage access controls for print files within their organizations, such as:
   a. who has access—e.g., designating specific groups and/or individual users who can print a file, which may be identity-based and/or require entry of predetermined credentials (for example, a password, personal identification number (PIN), biometric credential, etc.);
   b. what is accessible—e.g., enforcing revision control for parts/builds as discussed in further detail below;
   c. when access is permitted—e.g., allowing a print to be run only a limited number of times, and/or only on a specified date or within a specified date range (for example, on or after a release date, on or before an expiration date, etc.);
   d. where access is permitted—e.g., designating a print file, build, or revision as permitted to run only on certain printers.
6. Revocable access controls, so that a system administrator can revoke access to a secure 3D print file for one or more groups and/or individual users.

Revision Control

As noted above, a secure 3D print file format may allow revision control for parts/builds. Entities producing parts/builds (e.g., mechanical engineers) may produce different revisions, which may also be referred to as versions. If a part or build is updated, access control may be used to automatically deprecate or revoke revisions. A 3D printer may check for newer revisions to determine if the file is deprecated and should be rejected. If a newer version is available, the printer may retrieve another print file corresponding to the most recent version (e.g., from a digital parts store, or from a cloud-based 3D printing platform that might not include a store component). A part producer may designate a certain revision as revoked and disallow it from being used by one or more particular individuals, groups, and/or printers. Alternatively or additionally, a secure format may allow other revision-related restrictions such as who is allowed to create new revisions of a part, who is allowed to print certain revisions, how many times a certain revision can be printed, etc.

Distributed Supply Chain

As noted above, a secure 3D print file format may allow for the creation of a distributed supply chain. Customers may be able to delegate prints to untrusted third parties, knowing that access will not be allowed beyond those third parties. An organization may host a parts "shop" or "store" that provides (in some examples, for a fee) access to secure 3D print files, access to which is controlled. The parts shop may be configured to manage sales, prints, and "returns" of 3D parts encoded as secure 3D print files. One entity may be able to share parts with another entity that performs the printing, with reduced risk of theft and/or reverse engineering. Alternatively or additionally, an entity may purchase parts to print in a limited quantity, a limited number of times, etc. The ability to provide a distributed supply chain may help reduce supply chain complexity, because objects can be machined in-house by the customer without the print file supplier losing control of the print file.

As an example, an online supplier of part geometry may provide a parts store, which may operate logically within and/or adjacent to a commerce platform. The parts store may include components that allow third-party geometry vendors to administer the sale and/or usage of their 3D models to consumers. For example, a vendor may integrate a parts store within and/or adjacent to a 3D printing software platform. Within the platform, customers (e.g., registered users of the platform) may select and purchase commercial off-the-shelf (COTS) part designs, which customers may then print in-house. This simplified supply chain may help reduce costs for customers while simultaneously increasing profit for vendors.

In an embodiment, the 3D printing software platform is configured to inspect parts printed by customers, to automatically identify part completion and/or determine whether a part should be considered a "returned" and/or "failed" part. The 3D printing software platform may include secure 3D print features and/or access controls as described herein.

For illustrative purposes, the following is an example of a set of operations for secure 3D printing using a parts store according to an embodiment. Collectively, the parts store and commerce platform are referred to in this example as a "system":

1. The system receives an upload of part geometry from a vendor.
2. The system receives an order for the part geometry from a customer.
3. The system generates access controls for a secure 3D print file that provides the part geometry.
4. The system distributes the secure 3D print file to the customer, e.g., to a connected 3D printer associated with the customer.
5. An authentication and authorization service validates the print.
6. The printer starts.
7. The system receives one or more status updates from the printer and monitors print progress based on the status update(s).
8. The print completes.
9. A part inspection process validates print quality.
10. Based on a result of the part inspection, the system marks the print as "returned," "failed," or "completed."
11. The system notifies the vendor of the outcome of the purchase and print attempt.

Cryptography

One or more embodiments use cryptographic techniques to generate secure 3D print files (e.g., cryptographically secure MFPs and/or other print file formats). Specifically, one or more embodiments use strong cryptography to generate encrypted, tamper-proof print files. For example, one or more embodiments may use public key cryptography and/or private key cryptography to control access to 3D print files. For example, elliptic-curve cryptography (ECC), Rivest-Shamir-Adleman (RSA), advanced encryption standard (AES), and/or a secure hash algorithm (e.g., SHA-2 or SHA-3) may be used. One or more embodiments may use digital signatures and hybrid encryption.

System Architecture

A system according to one or more embodiments includes one or more secure 3D print files. Each secure 3D print file may be encrypted and signed. The secure 3D print file format may include rules encoded in the file about how the file can be used (e.g., who, what, when, and/or where, as discussed above).

The system may include an authorization/authentication service (or "auth service" for short). The auth service may be configured to generate secure 3D print files using cryptographic techniques. The auth service may be configured to determine whether a given entity is authorized to access a particular secure 3D print file. The auth service may include an application programming interface (API) that allows requestors (e.g., customers of a parts store) to supply credentials and request authorization to print from a particular print file. The auth service may include a data repository configured to store credentials and/or other data needed to provide authentication/authorization services.

The system includes one or more 3D printers. A 3D printer may include executable instructions (implemented as software and/or firmware) that, when executed by one or more processors of the 3D printer, cause the processor(s) to perform operations for secure 3D printing.

The operations may include communicating with an auth service. The operations may include interpreting the rulesets encoded in secure 3D print files. The operations may include, based on a ruleset, determining whether/when it may be necessary to contact the auth service (e.g., prior to use of a print file). The operations may include communicating with the auth service (e.g., via an API of the auth service) to confirm that the 3D printer is authorized to print from that file. Alternatively or additionally, the operations may include authenticating access to secure 3D print files without communicating with an auth service each time (for example, if attribute-based encryption (ABE) is used). Alternatively or additionally, instructions for secure 3D printing may be stored and executed by a computer system (e.g., a general purpose computer) communicatively coupled with a 3D printer (e.g., via a USB cable, local area network, etc.).

A 3D printer may be configured with particular authorization credentials (e.g., based on user input via a user interface of the 3D printer). Alternatively or additionally, a unique identifier associated with a 3D printer (e.g., a serial number, media access control (MAC) address, etc.) may serve as an authorization credential.

Additional Security Features and Considerations

In an embodiment, a cloud storage system (e.g., Amazon Web Services (AWS), Microsoft Azure, and/or another cloud storage system) may be considered a trusted entity. One or more components may be configured to store data in a cloud storage system. For example, an auth service may be configured to store private keys in a cloud storage system. However, web browsers might not be considered trusted entities, and accordingly private keys might not be stored in a web browser. In this approach, web browsers may be required to access an auth service API to perform cryptographic functions. If a private key is exposed, expires, or is otherwise considered insecure and/or invalid, a printer may be configured to communicate with an auth service to obtain a new private key.

Secure 3D print files may be "tamper-evident" at rest. "Tamper-evident" means that if a secure 3D print file is either inadvertently corrupted or intentionally modified without authorization, it will fail a validation check and printing will not be authorized. One or more secure transmission protocols (e.g., secure hypertext transfer protocol (HTTPS), secure file transfer protocol (SFTP), etc.) may provide an additional layer of security when a secure 3D print file is in transit to the intended recipient.

Once a printer has received a secure 3D print file and the file's integrity has been checked (i.e., it is confirmed that the file has not been tampered with since the intended authorization information was encoded), the printer may assume that the contents (i.e., instructions and/or model) of the secure 3D print file are valid. Accordingly, the printer might not need to check the file's integrity again and may ignore and/or discard any "container" data designed to make the file tamper-evident.

As noted above, a unique identifier associated with a 3D printer (e.g., a serial number, media access control (MAC) address, etc.) may serve as an authorization credential. Secure 3D print files may be "printer-locked" so that only a printer with an authorized identifier (which may be a specific authorized identifier or fall within a consecutive range of authorized identifiers) is able to decrypt the contents. Printer locking may require only a printer-side check, and may be performed offline, i.e., without network access to an auth service.

In some cases, a printer might not store a date and/or time that is consistent with the date and/or time stored by an entity providing a secure 3D print file. The printer's date and/or time may be misconfigured, either unintentionally or intentionally in an effort to circumvent a date/time-based restriction on a secure 3D print file. (For example, in other contexts, changing the system date has been used to avoid expiration of time-limited software licenses.) Accordingly, when a secure 3D print file includes a date/time-based restriction, authorization may require a connection to an auth service (e.g., over the Internet), so that the auth service's current date and/or time are referenced instead of the printer's date and/or time.

As noted above, secure 3D print files may be limited to a certain number of prints. An end-user's printer might not be trusted to maintain an accurate count of prints performed to date. In addition, for customers using multiple printers, a single printer might not be trusted to have knowledge of the global print count for all printers. Accordingly, when a secure 3D print file includes a print count restriction, authorization may require a connection to an auth service (e.g., over the Internet), so that the auth service can maintain an accurate, authoritative record of prints performed against the print count restriction.

One or more embodiments support offline secure 3D printing. In offline printing, the printer itself is offline, i.e., not in communication with a parts store, cloud-based 3D printing service, and/or auth service. A separate device (e.g., a client computer or other connected device separate from the printer) may be used to obtain a print file, which may then be transferred to the printer (e.g., using removable media or a local network connection). The specific techniques used to obtain a print file and transfer the file to the printer may vary from one implementation to the next and/or based on file-specific security considerations. For example, offline printing of an ITAR-controlled print file would generally require more stringent security procedures than offline printing of a consumer part.

Offline approaches introduce the risk that a private key may eventually be exposed and not replaced with a new private key. Accordingly, to help protect the security of connected services, offline printing may use different signing keys than connected printing. Offline approaches may include techniques for replacing a private key that has been compromised. For example, a private key may be changed via a firmware update, generated on-device, and/or exchanged via a file transfer with an auth service. In addition, offline approaches do not allow a connected auth service to track print counts. Accordingly, offline approaches may include a printer-side database (which may be encrypted against unauthorized access or manipulation) or other form of data storage for centralized tracking of print counts. Alternatively or additionally, offline devices may form a "web of trust"/blockchain that can provide authorization by consensus, even when an auth service is not accessible.

Diagram Examples

FIG. 1 is a sequence diagram of an example of operations 100 for 3D printing according to an embodiment. Specifically, the operations illustrated in FIG. 1 are an example of a print flow initiated by a user 102 who uploads 104 part geometry to a server 106 via a user interface 110 operating on a client device 108. The server 106 communicates with a printer 112 to perform the 3D print. The user 102 (or, in some embodiments, another user) sends a print command 114 to the server 106 directing that the part be printed on printer 112. Then, server 106 sends another print command 116 to printer 112 with an identifier (printId) of the part. Printer 112 requests 118 the print file 120, which server 106 sends to the printer 112. Printer 112 validates 122 the print file 120 and then begins 124 printing the part. In response, printer 112 sends a begin signal 126 to server 106 verifying that the printing has begun. Periodically as the part continues to print, printer 112 sends a progress signal 128 to server 106 with updates on the progress of the printing process. Upon completion of printing, printer 112 sends a completion signal 130 to server 106 verifying that the printing has completed.

Figure 2:
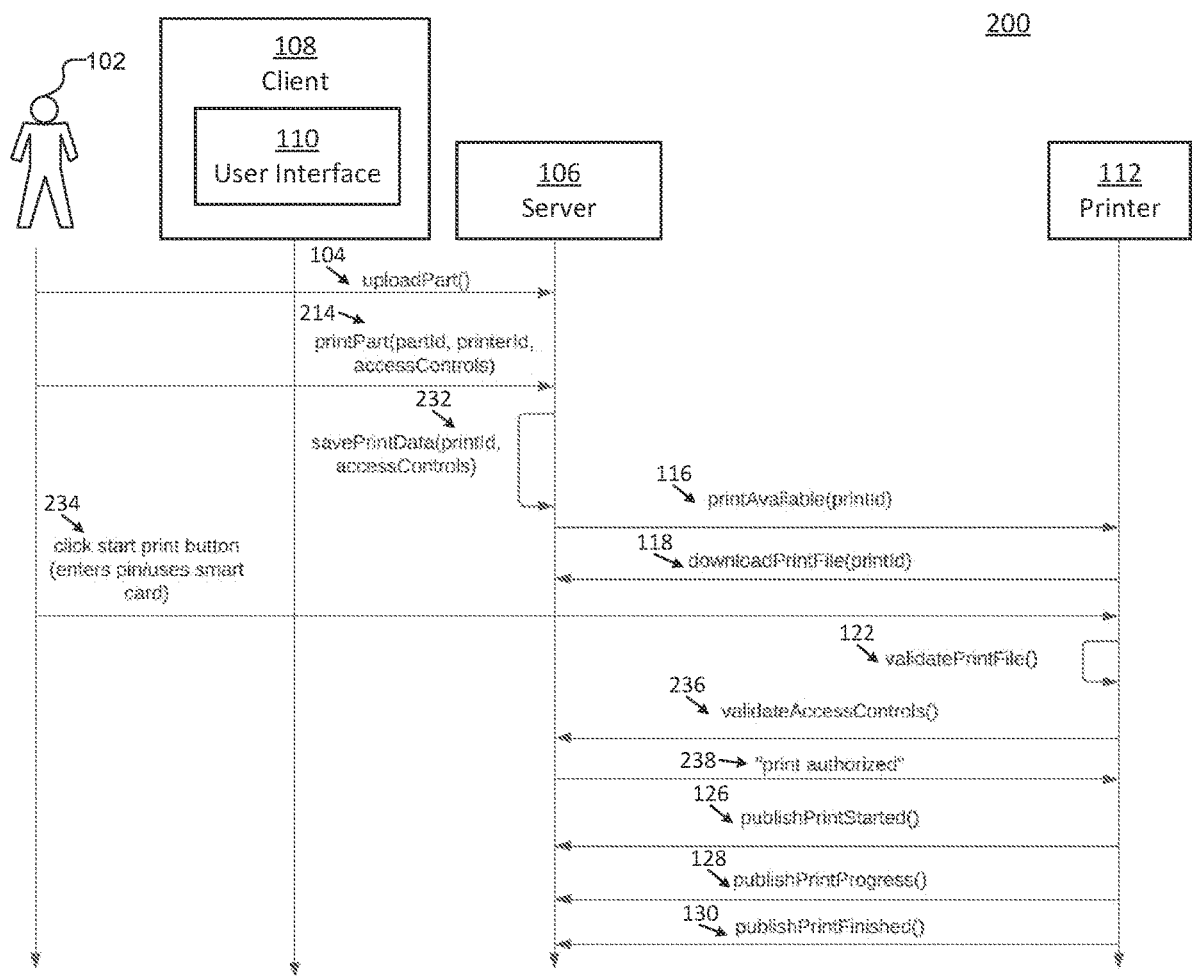
FIG. 2 is a diagram of an example of operations for secure 3D printing according to one or more embodiments.

FIG. 2 is a sequence diagram of an example of operations 200 for secure 3D printing according to an embodiment. As in the example of FIG. 1, a user 102 uploads 104 part geometry to a server 106 via a user interface 110. However, in this example, the server 106 includes an auth service and also is responsible for validating access controls before the printer 112 is authorized to print the part. A user may be required to provide credentials on the device (e.g., the printer itself or a device communicatively coupled with the printer) to start a print. The user 102 (or, in some embodiments, another user) sends a secured print command 214 to the server 106 directing that the part be printed on printer 112. Secured print command 214 includes access controls. Server creates 232 a secure print file using the access controls and the part geometry, and then server 106 sends print command 116 to printer 112 with an identifier (printId) of the part. Printer 112 requests 118 to download the secure print file. After downloading the secure print file, the user initiates printing 234 on the printer 112 (e.g., by clicking a "start print" button on the printer 112 or within the user interface 110, by entering a PIN, or by inserting a smart card). Printer 112 validates 122 the secure print file and also validates 236 the access controls. In response, the print is authorized 238, so printer 112 begins printing the part. In response, printer 112 sends a begin signal 126 to server 106 verifying that the printing has begun. Periodically as the part continues to print, printer 112 sends a progress signal 128 to server 106 with updates on the progress of the printing process. Upon completion of printing, printer 112 sends a completion signal 130 to server 106 verifying that the printing has completed.

Figure 3:
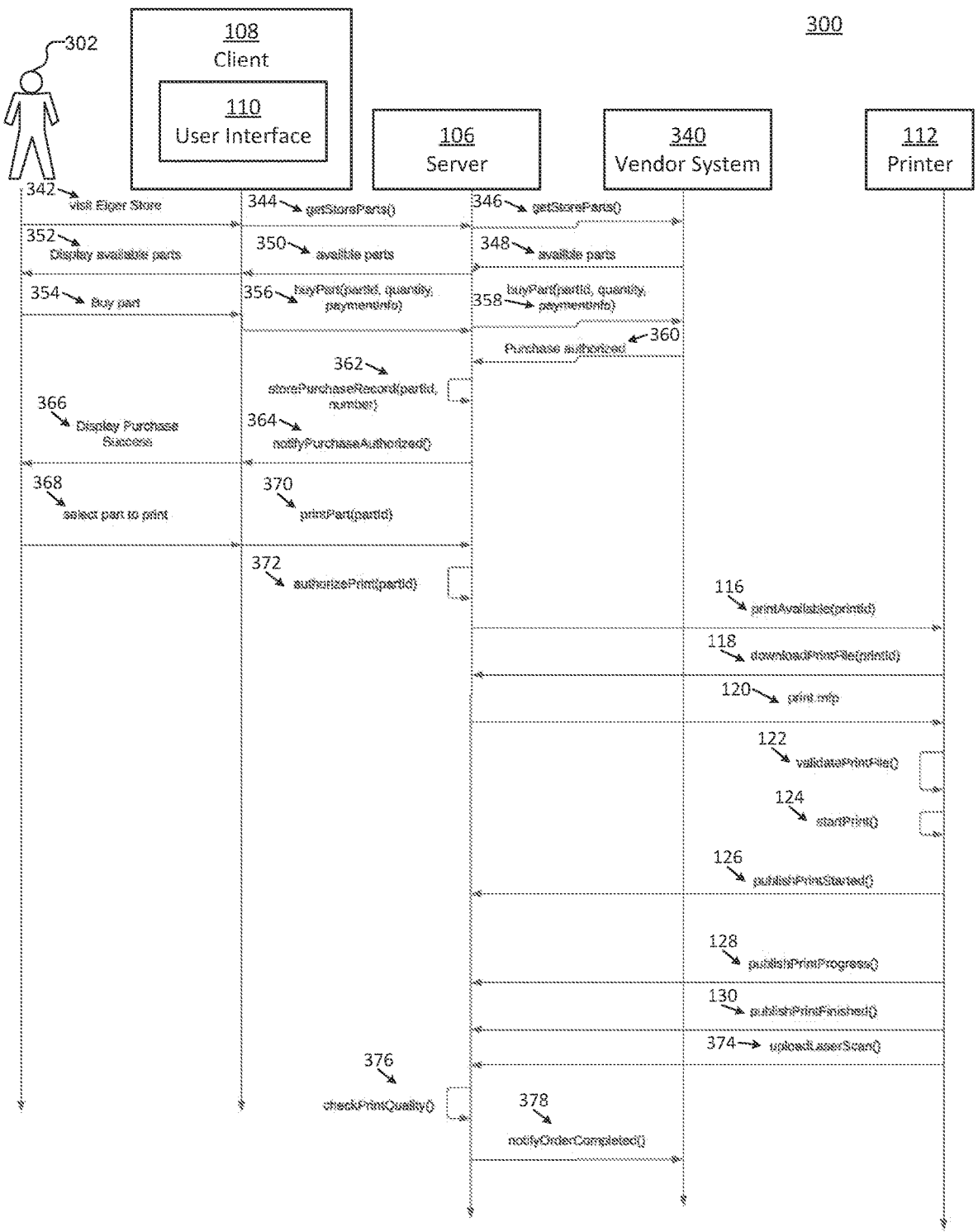
FIG. 3 is a diagram of an example of operations for 3D printing using a parts store according to one or more embodiments.

FIG. 3 is a sequence diagram of an example of operations 300 for 3D printing using a parts store according to an embodiment. In this example, the user 302 may be a customer and the part geometry is provided by a vendor system 340. The server 106 hosts the store, which the user 302 accesses via a user interface 110 to purchase parts. The example illustrated in FIG. 3 may be extended to include server-side validation of access controls, to authorize printing as illustrated in FIG. 2. The access controls may be based, at least in part, on what the user purchased (e.g., which parts, a limited number of prints, a time-limited license, etc.). User 302 operates user interface 110 to visit 342 a parts store. User interface 110 requests 344 a list of parts from the store on the server 106, which in turn requests 346 the parts from vendor system 340. Vendor system 340 returns the list of available parts 348, which the server 106 forwards 350 to the client device 108, so that the user interface 110 can display 352 the list of available parts 348 to the user 302. The user 302 then selects 354 a particular part for purchase via the user interface 110. User interface sends a purchase request 356 to the server 106 (including the partId, a quantity of parts, and payment information), which the server 106 forwards 358 to the vendor system 340. Upon the vendor system 340 authorizing the purchase, server 106 stores 362 a purchase record listing the partId and the number of parts purchased and notifies 364 the client device 108 that the purchase has been authorized. This allows the user interface 110 to notify 366 the user 302 of the successful purchase. Then user 302 may select 368 a purchased part to print using the user interface 110. User interface sends a print command 370 to the server 106 directing that the selected part be printed on printer 112. Then, server 106 authorizes 372 the print with reference to the stored purchase record. Then, server 106 sends another print command 116 to printer 112 with an identifier (printId) of the selected part. Printer 112 requests 118 the print file 120, which server 106 sends to the printer 112. Printer 112 validates 122 the print file 120 and then begins 124 printing the part. In response, printer 112 sends a begin signal 126 to server 106 verifying that the printing has begun. Periodically as the part continues to print, printer 112 sends a progress signal 128 to server 106 with updates on the progress of the printing process. Upon completion of printing, printer 112 sends a completion signal 130 to server 106 verifying that the printing has completed. In addition, the printer initiates a scan (e.g., a laser scan) of the printed part and uploads 374 the scan to the server 106. Server checks 376 the quality of the scan. If the quality is of sufficiently high quality, then server 106 notifies the vendor system 340 of completion (or partial completion) of the order.

Figure 4:
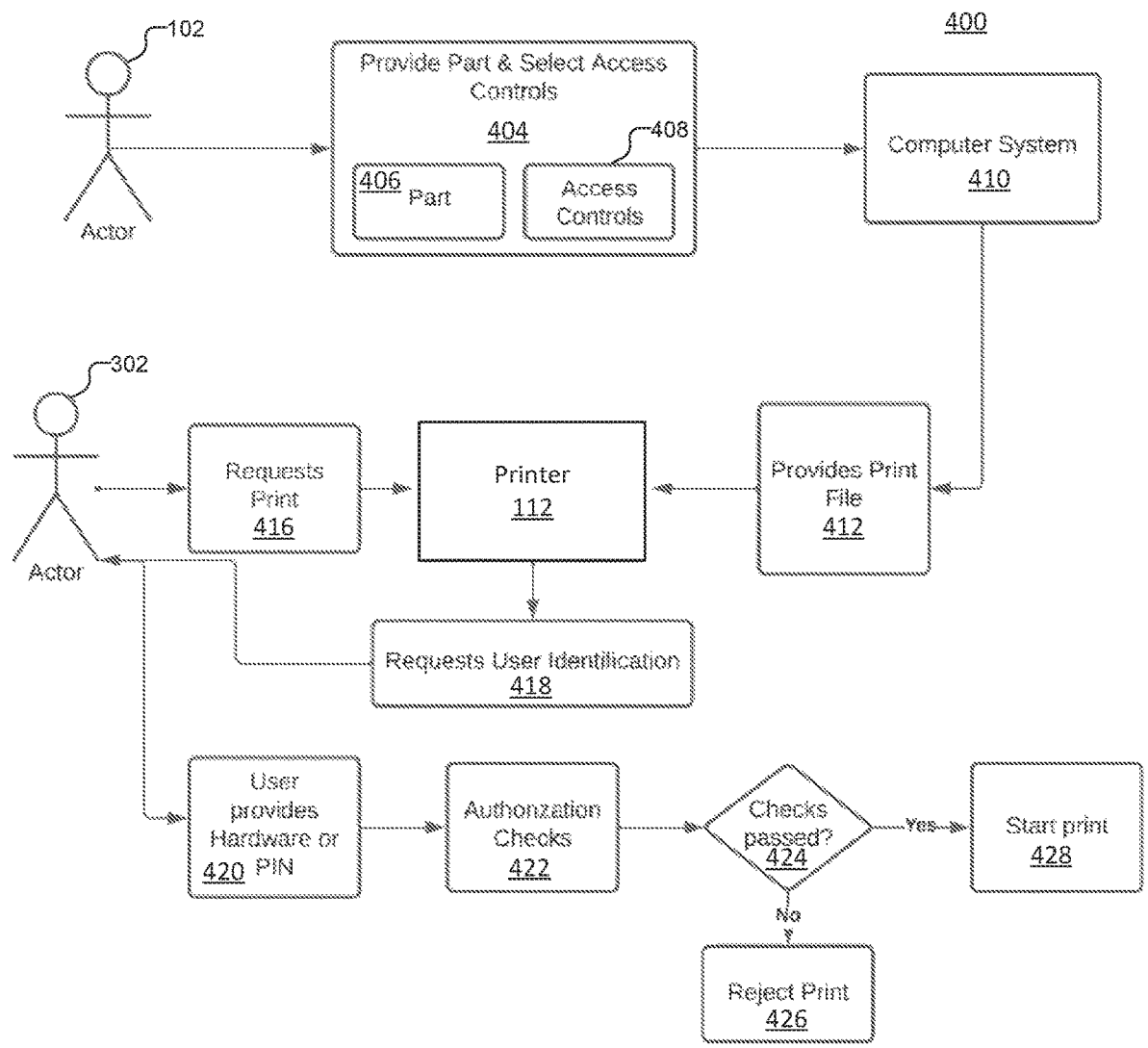
FIG. 4 is a block diagram of an example system comprising access controls to secure 3D print files according to one or more embodiments.

FIG. 4 is a block diagram of a system 400 comprising access controls to secure 3D print files according to an embodiment. A 3D printer 112 receives 412 a secure 3D print file and performs authorization checks 422 (optionally in communication with an auth service) before printing. In this example, the authorization checks 422 include validating a hardware ID and/or PIN supplied 420 by a user 302. A user 102 acting as a supplier or vendor provides 404 one or more parts 406 and access controls 408 to a computer system 410. Computer system 410 then generates secured print files using respective parts 406 and access controls 408 and sends 412 the secured print files to the printer 112. Upon a user 302 requesting 416 printing of a particular secured file, printer 112 requests 418 user identification from the user 302. In response, user 302 provides 420 a hardware ID or PIN, and printer 112 performs authorization checks 422. Upon determining 424 whether the checks pass, if the checks fail, the print request is rejected 426. If the checks pass, then printer 112 begins printing 428 the selected part.

Figure 5:
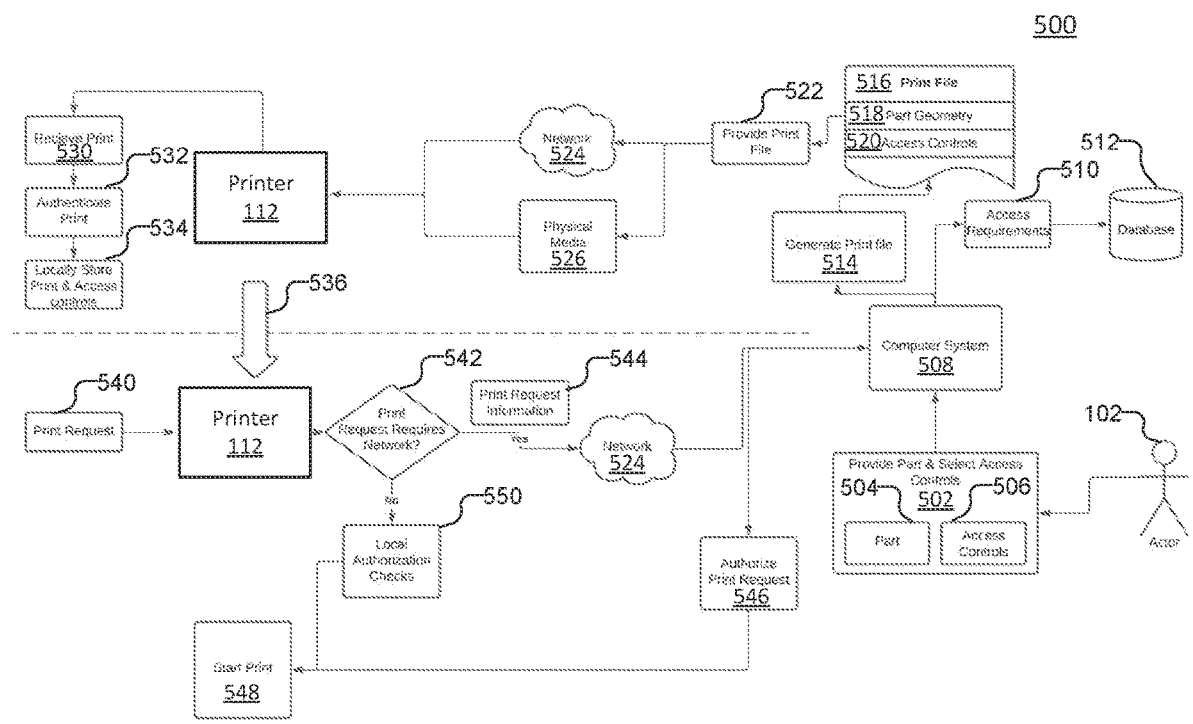
FIG. 5 is a block diagram of an example system comprising administration of access controls according to one or more embodiments.

FIG. 5 is a block diagram of a system 500 comprising administration of access controls 506 according to an embodiment. As illustrated in FIG. 5, a computer system 508 may store access requirements 510 for each print file 516 (generated 514 by computer system 508 in response to a user 102 providing 502 a part 504 and access controls 506) in a database 512. The computer system 508 may retrieve the access requirements 510 when generating a print file and/or authenticating a print. FIG. 5 further illustrates an example of local authorization checks 550, in a scenario where a print request 540 does not require a network connection (check 542 fails) for authorization. A 3D printer 112 may also store print and access controls locally, i.e., in storage maintained by the printer itself. If check 542 is affirmative, then information 544 about the print request 540 is forwarded across network 524 to computer system 508 for authenticating the print request 540 with reference to the access requirements 510 in the database 512. In response to either the local authorization checks 550 succeeding or the computer system 508 authorizing 546 the print request 540, printer 112 begins printing 548. Print file 516 includes print geometry 518 and access controls 520. Computer system 508 also provides 522 the print file 516 to the printer 112 either via network 524 or via physical media 526. Printer 112 is configured to receive 530 a print, authenticate 532 the print, and locally store 534 print and access controls.

Figure 6:
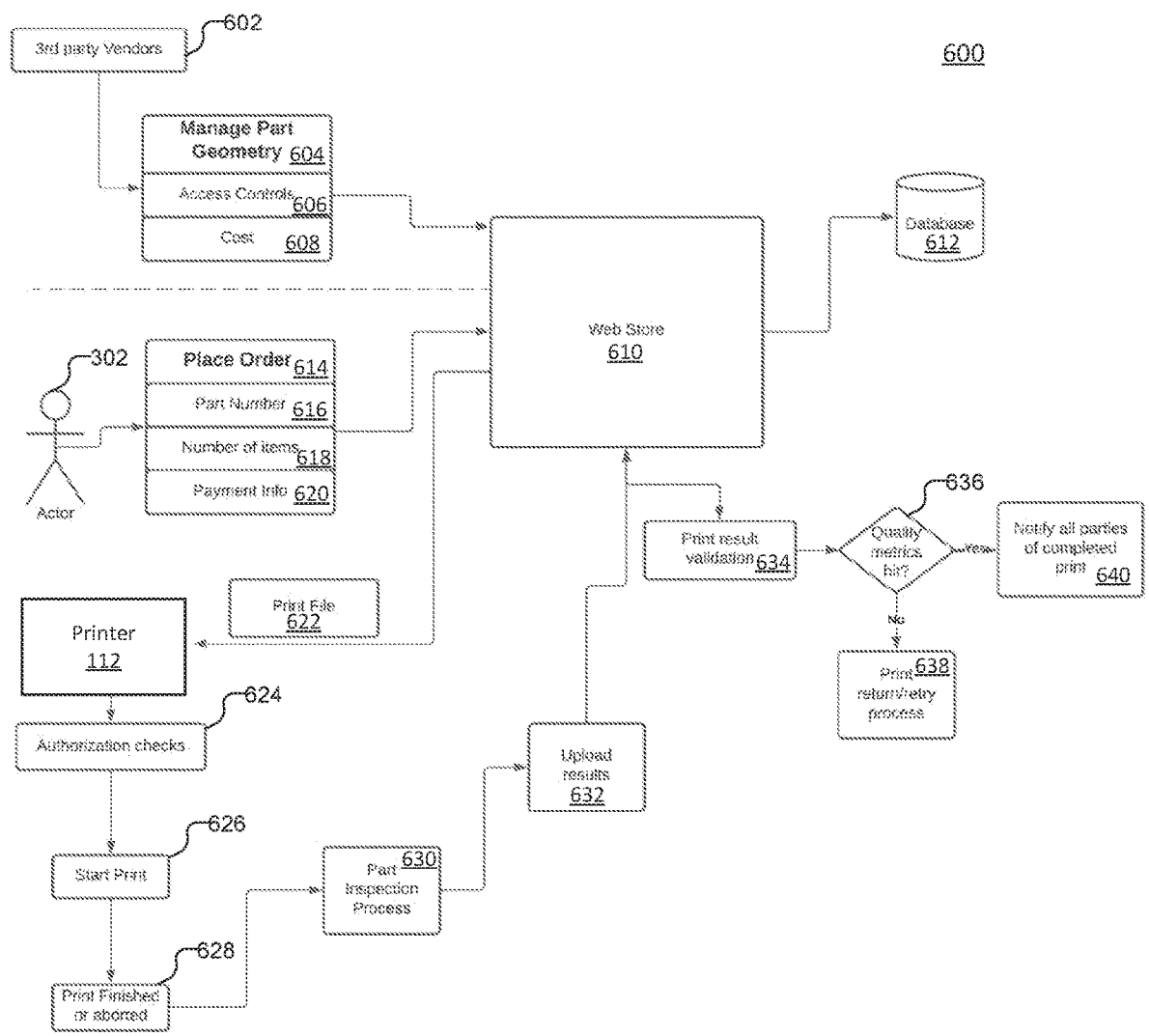
FIG. 6 is a block diagram of an example system comprising a third-party vendor store platform for 3D printing according to one or more embodiments.

FIG. 6 is a block diagram of a system 600 comprising a third-party vendor store platform for 3D printing. Specifically, in this example, a vendor 602 is responsible for managing part geometry 604, access controls 606, part cost 608, etc. The system includes a web store 610, which stores information about parts in a database 612. End users 302 place orders 614 for parts, which may include restrictions such as a limited number 618 of items to print, etc. in addition to a part number 616 and payment information 620. In response, web store 610 sends a print file 622 to a 3D printer 112, which communicates print status to the web store 610, which generates corresponding notifications. Printer 112 performs authorization checks 624 on a print file 622. If successful, it begins printing 626. Upon the printing completing or aborting 628, printer 112 engages in a print inspection process 630 (e.g., by performing a scan) and uploads 632 the results to the web store 610. If the results indicate a successful print of the part and a quality determination 636 determines that quality metrics have been met, then all parties (e.g., the end user 302 and the vendor 602) are notified of the successful completion. If the results indicate an unsuccessful print of the part or a quality determination 636 determines that quality metrics have not been met, then either the part may be returned or printer 112 may retry to print it again.

Databases

In the examples discussed herein, data is stored in one or more databases. More generally, data may be stored in one or more data repositories. A data repository is any type of storage unit and/or device (e.g., a file system, database, collection of tables, or any other storage mechanism) for storing data. A data repository may include multiple different storage units and/or devices. The multiple different storage units and/or devices may or might not be of the same type or located at the same physical site. Further, a data repository may be implemented or may execute on the same computing system as one or more other components of a system.

Alternatively or additionally, a data repository may be implemented or executed on a computing system separate from one or more other components of the system. A data repository may be logically integrated with one or more other components of the system. Alternatively or additionally, a data repository may be communicatively coupled to one or more other components of the system via a direct connection or via a network.

Digital Devices

One or more components of systems described herein are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

User Interfaces Examples described herein may include one or more user interfaces. A user interface refers to hardware and/or software configured to facilitate communications between a user and one or more system components. A user interface renders user interface elements and receives input via user interface elements. A user interface may be a graphical user interface (GUI), a command line interface (CLI), a haptic interface, a voice command interface, and/or any other kind of interface or combination thereof. Examples of user interface elements include checkboxes, radio buttons, dropdown lists, list boxes, buttons, toggles, text fields, date and time selectors, command lines, sliders, pages, and forms. Different components of a user interface may be specified in different languages. The behavior of user interface elements may be specified in a dynamic programming language, such as JavaScript. The content of user interface elements may be specified in a markup language, such as hypertext markup language (HTML), Extensible Markup Language (XML), or XML User Interface Language (XUL). The layout of user interface elements may be specified in a style sheet language, such as Cascading Style Sheets (CSS). Alternatively or additionally, aspects of a user interface may be specified in one or more other languages, such as Java, Python, Perl, C, C++, and/or any other language or combination thereof.

General; Computer Systems; Networks; Cloud Computing

In an embodiment, a system includes one or more devices, including one or more hardware processors, that are configured to perform any of the operations described herein and/or recited in any of the claims.

In an embodiment, one or more non-transitory computer-readable storage media store instructions that, when executed by one or more hardware processors, cause performance of any of the operations described herein and/or recited in any of the claims.

Any combination of the features and functionalities described herein may be used in accordance with an embodiment. In the foregoing specification, embodiments have been described with reference to numerous specific details that may vary from implementation to implementation. Accordingly, the specification and figures are to be regarded in an illustrative rather than a restrictive sense. The sole and exclusive indicator of the scope of the invention, and what is intended by the Applicant to be the scope of the invention, is the literal and equivalent scope of the set of claims that issue from this application, in the specific form in which such claims issue, including any subsequent correction.

In an embodiment, techniques described herein are implemented by one or more special-purpose computing devices (i.e., computing devices specially configured to perform certain functionality). The special-purpose computing device(s) may be hard-wired to perform the techniques and/or may include digital electronic devices such as one or more application-specific integrated circuits (ASICs), field programmable gate arrays (FPGAs), and/or network processing units (NPUs) that are persistently programmed to perform the techniques. Alternatively or additionally, a computing device may include one or more general-purpose hardware processors programmed to perform the techniques pursuant to program instructions in firmware, memory, and/or other storage. Alternatively or additionally, a special-purpose computing device may combine custom hard-wired logic, ASICs, FPGAs, or NPUs with custom programming to accomplish the techniques. A special-purpose computing device may include a desktop computer system, portable computer system, handheld device, networking device, and/or any other device(s) incorporating hard-wired and/or program logic to implement the techniques.

Figure 7:
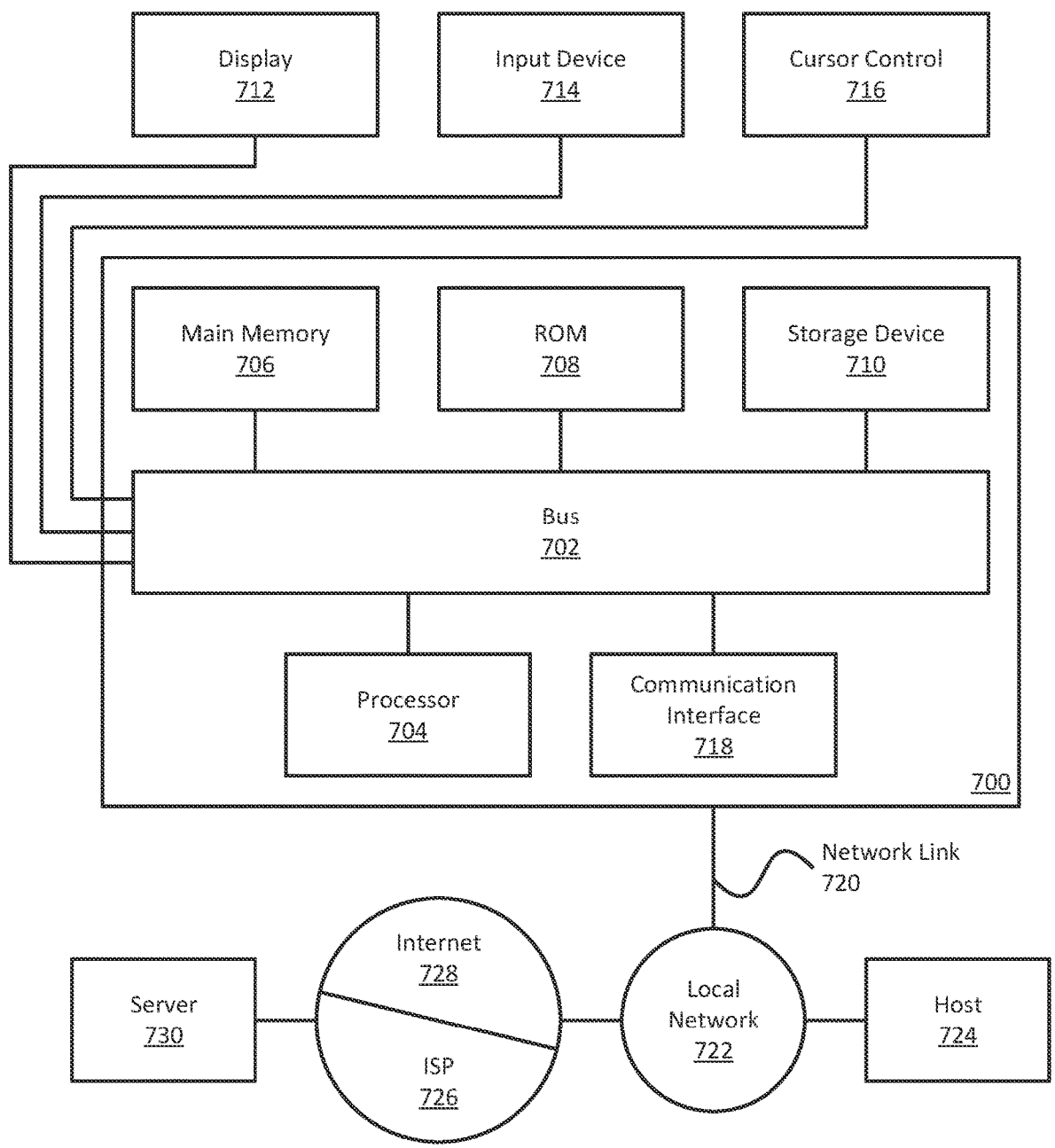
FIG. 7 is a block diagram of an example of a computer system according to one or more embodiments.

For example, FIG. 7 is a block diagram of an example of a computer system 700 according to an embodiment. Computer system 700 includes a bus 702 or other communication mechanism for communicating information, and a hardware processor 704 coupled with the bus 702 for processing information. Hardware processor 704 may be a general-purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in one or more non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a liquid crystal display (LCD), plasma display, electronic ink display, cathode ray tube (CRT) monitor, or any other kind of device for displaying information to a computer user. An input device 714, including alphanumeric and other keys, may be coupled to bus 702 for communicating information and command selections to processor 704. Alternatively or additionally, computer system 700 may receive user input via a cursor control 716, such as a mouse, a trackball, a trackpad, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. Alternatively or additionally, computer system 7 may include a touchscreen. Display 712 may be configured to receive user input via one or more pressure-sensitive sensors, multi-touch sensors, and/or gesture sensors. Alternatively or additionally, computer system 700 may receive user input via a microphone, video camera, and/or some other kind of user input device (not shown).

Computer system 700 may implement the techniques described herein using customized hard-wired logic, one or more ASICs or FPGAs, firmware, and/or program logic which in combination with other components of computer system 700 causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. Alternatively or additionally, hard-wired circuitry may be used in place of or in combination with software instructions.

The term "storage media" as used herein refers to one or more non-transitory media storing data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape or other magnetic data storage medium, a CD-ROM or any other optical data storage medium, any physical medium with patterns of holes, a RAM, a programmable read-only memory (PROM), an erasable PROM (EPROM), a FLASH-EPROM, non-volatile random-access memory (NVRAM), any other memory chip or cartridge, content-addressable memory (CAM), and ternary content-addressable memory (TCAM).

A storage medium is distinct from but may be used in conjunction with a transmission medium. Transmission media participate in transferring information between storage media. Examples of transmission media include coaxial cables, copper wire, and fiber optics, including the wires that comprise bus 702. Transmission media may also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer may load the instructions into its dynamic memory and send the instructions over a network, via a network interface controller (NIC), such as an Ethernet controller or Wi-Fi controller. A NIC local to computer system 700 may receive the data from the network and place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams.

The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722, and communication interface 718.

The received code may be executed by processor 704 as it is received, and/or stored in storage device 710, or other non-volatile storage for later execution.

In an embodiment, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (for example, a request to execute a particular application and/or retrieve a particular set of data). A server process responds by executing the requested service and/or returning corresponding data.

A computer network may be a physical network, including physical nodes connected by physical links. A physical node is any digital device. A physical node may be a function-specific hardware device. Examples of function-specific hardware devices include a hardware switch, a hardware router, a hardware firewall, and a hardware NAT. Alternatively or additionally, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (for example, a physical network). Each node in an overlay network corresponds to a respective node in the underlying network. Accordingly, each node in an overlay network is associated with both an overlay address (to address the overlay node) and an underlay address (to address the underlay node that implements the overlay node). An overlay node may be a digital device and/or a software process (for example, a virtual machine, an application instance, or a thread). A link that connects overlay nodes may be implemented as a tunnel through the underlying network. The overlay nodes at either end of the tunnel may treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources may be shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). In a hybrid cloud, a computer network includes a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, a system supports multiple tenants. A tenant is a corporation, organization, enterprise, business unit, employee, or other entity that accesses a shared computing resource (for example, a computing resource shared in a public cloud). One tenant (through operation, tenant-specific practices, employees, and/or identification to the external world) may be separate from another tenant. The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In an embodiment, in a multi-tenant computer network, tenant isolation is implemented to ensure that the applications and/or data of different tenants are not shared with each other. Various tenant isolation approaches may be used. In an embodiment, each tenant is associated with a tenant ID. Applications implemented by the computer network are tagged with tenant ID's. Additionally or alternatively, data structures and/or datasets, stored by the computer network, are tagged with tenant ID's. A tenant is permitted access to a particular application, data structure, and/or dataset only if the tenant and the particular application, data structure, and/or dataset are associated with a same tenant ID. As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants. A subscription list may indicate which tenants have authorization to access which applications. For each application, a list of tenant ID's of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels may be used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

Process

Figure 8:
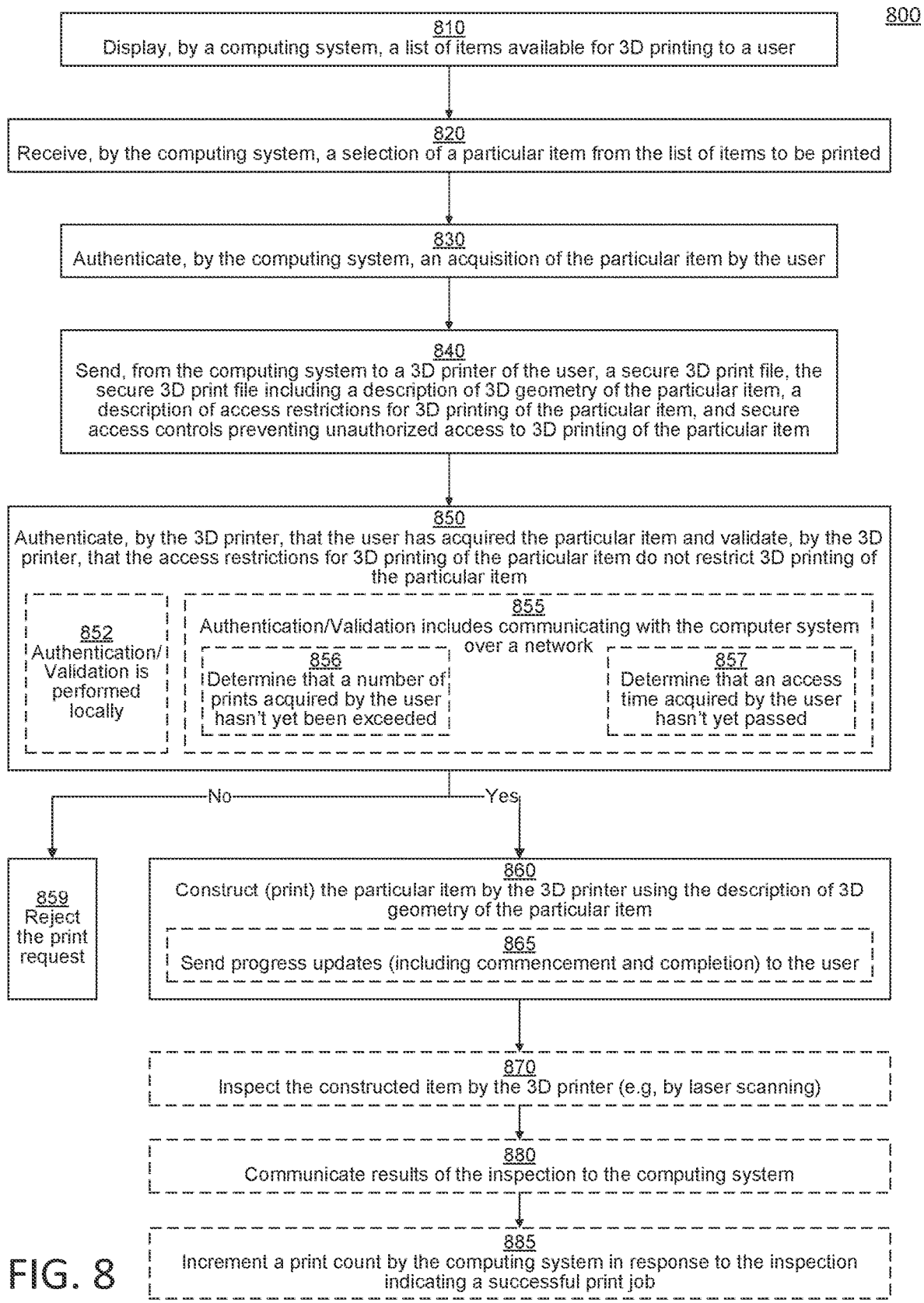
FIG. 8 is a flowchart of an example method according to one or more embodiments.

FIG. 8 is a flowchart illustrating an example method 800 according to one or more embodiments. It should be understood that any time a piece of software is described as performing a method, process, step, or function, what is meant is that a computer system 700 on which that piece of software is running performs the method, process, step, or function when executing that piece of software on its processor 704. It should be understood that one or more of the steps or sub-steps of method 800 may be omitted in some embodiments. Similarly, in some embodiments, one or more steps or sub-steps may be combined together or performed in a different order. Dashed lines indicate that a step or sub-step is either optional or representative of alternate embodiments or use cases.

In step 810, a computing system (e.g., one or more of client device 108, server 106, and vendor system 340 in communication across network 524) displays (e.g., via user interface 110) a list of items that are available for 3D printing to a user 302. See above in connection with 342-352.

Subsequently, in step 820, the computing system receives a selection of a particular item from the displayed list of items to be printed. See above in connection with 354.

The computing system then authenticates an acquisition of the selected particular item by the user 302. This authentication of acquisition may include confirming a part identity, a number of items, a cost, and payment credentials. See above in connection with 356-366.

In step 840, the computing system sends a secure 3D print file 516, 622 to a 3D printer available to the user 302. The secure 3D print file 516, 622 includes a description of 3D geometry 518 of the particular item, a description of access restrictions 510 for 3D printing of the particular item, and secure access controls 520 preventing unauthorized access to 3D printing of the particular item. See above in connection with 368-372, 116-120, 416, and 540.

In step 850, the 3D printer 112, upon receiving the secure 3D print file 516, 622, authenticates that the user 302 has acquired the particular item and validates that the access restrictions 510 for 3D printing of the particular item do not restrict the 3D printer from printing the particular item. See above in connection with 122, 236, 418-424, 542-546, 550, 624.

In some embodiments, step 850 may include sub-step 852. In sub-step 852, the authentication and validation is performed locally, e.g., by performing cryptographic operations on the received secure 3D print file 516, 622, secure access controls 520, access restrictions 510, and/or credentials provided by the user 302 (see 420). See above in connection with 550.

In some embodiments, step 850 may include sub-step 855. In sub-step 855, the authentication and validation includes communication with the computer system over network 524. See above in connection with 542-546. For example, 3D printer 112 may communicate with computer system 508 to obtain access requirements 510 from database 512. In one embodiment, access requirements 510 includes a number 618 of times that the item associated with a part number 616 may be printed by the user 302 as well as a count of how many times that item has already been printed by the user 302. Thus, in sub-step 856, 3D printer 112 and/or computer system 508 determines that the count of the number of times that the user 302 has already printed the item has not yet reached or exceeded the number 618 of times that the item may be printed by the user 302. In one embodiment, access requirements 510 includes an allowable period of time during which the user 302 is permitted to print the item. Thus, in sub-step 857, 3D printer 112 and/or computer system 508 determines that the allowable period is still ongoing with reference to a current date/time maintained by the computer system 508 (in case the date/time of the 3D printer 112 has been altered improperly).

In the event that either the authentication or validation of step 850 fails, operation proceeds with step 859, in which the print request 540 is rejected, and 3D printer 112 refrains from printing the selected particular item. See above in connection with 424-426.

If both the authentication and validation of step 850 succeed, operation proceeds with step 860, in which the print request 540 is fulfilled by the 3D printer 112 constructing (i.e., "printing") the particular item using the description of the 3D geometry 518 of the item. See above in connection with 124, 424, 428, 548, 626. In some embodiments, in sub-step 865, 3D printer 112 sends progress updates to the user 302 (e.g., via user interface 110 operating on client device 108) and/or server 106, such as by indicating commencement of printing (see above in connection with 126), one or more interim progress reports (see above in connection with 128), and by indicating completion of printing (see above in connection with 130).

Upon completion of printing (whether the item is finished or whether the printing was aborted), in step 870, 3D printer 112 inspects the item constructed by the 3D printer 112 (see above in connection with 630). For example, this inspection may be performed using laser scanning. In step 880, 3D printer 112 communicates the results of the inspection (e.g., the laser scan) to the computing system, such as to server 106 (see above in connection with 374, 632). Then, the server 106 may check the quality of the item as printed (see above in connection with 376, 634-636). If the quality is insufficient to pass inspection, then the item may be returned, the printing may be retried, or no action may be taken (see above in connection with 638). Otherwise, all parties may be notified of the successful printing (see above in connection with 378, 640). In some embodiments, in step 885, computer system 508 increments the count of how many times the item has already been printed by the user 302 in response to the success.

It should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, system, computer program product, or other concept is specifically labeled as "background" or as "conventional," Applicant makes no admission that such technique, method, apparatus, system, computer program product, or other concept is actually prior art under 35 U.S.C. § 102 or § 103, such determination being a legal determination that depends upon many factors, not all of which are known to Applicant at this time.

What is claimed is:

1. A method of securely performing 3-dimensional (3D) printing, the method comprising:
displaying, by a computing system, a list of items available for 3D printing to a user;
receiving, by the computing system, a selection, from the user, of a particular item from the list of items;
authenticating, by the computing system, an acquisition of the particular item by the user;
sending, from the computing system to a 3D printer of the user, a secure 3D print file, the secure 3D print file including a description of 3D geometry of the particular item, a description of access restrictions for 3D printing of the particular item, and secure access controls preventing unauthorized access to 3D printing of the particular item, the description of the access restrictions indicating a maximum number of times that the user is permitted to print the selected item;
authenticating, by the 3D printer, that the user has acquired the particular item and validating, by the 3D printer, that the access restrictions for 3D printing of the particular item do not restrict 3D printing of the particular item by the 3D printer, wherein validating includes:
the 3D printer obtaining, from the computing system, a count of a number of times that the user has already printed the selected item and
verifying that the count obtained from the computing system does not exceed the maximum number;
in response to authenticating and validating by the 3D printer, constructing the particular item by the 3D printer using the description of 3D geometry of the particular item;
in response to completion of constructing the particular item by the 3D printer, inspecting, by the 3D printer, the particular item as constructed by the 3D printer;
communicating inspection results from the 3D printer to the computing system; and
in response to the computing system determining that the inspection results indicate that the particular item as constructed by the 3D printer meets quality assurance standards indicative of successful completion of printing the particular item, incrementing the count of the number of times that the user has already printed the selected item.

2. The method of claim 1 wherein:
the description of the access restrictions indicates an allowable period of time during which the user is permitted to print the selected item; and
validating further includes:
the 3D printer communicating with the computing system to obtain a current time from the computing system; and
verifying that the current time obtained from the computing system is within the allowable period of time.

3. The method of claim 1 wherein inspecting the particular item as constructed by the 3D printer includes performing, by the 3D printer, a laser scan of the particular item as constructed by the 3D printer.

4. The method of claim 1 wherein the method further comprises, while constructing the particular item by the 3D printer, sending progress updates from the 3D printer to the computing system for display to the user.

5. A system for securely performing 3-dimensional (3D) printing, the system comprising:
computing equipment configured to:
display a list of items available for 3D printing to a user;
receive a selection from the user of a particular item from the list of items;

authenticate an acquisition of the particular item by the user; and send, to a 3D printer of the user, a secure 3D print file, the secure 3D print file including a description of 3D geometry of the particular item, a description of access restrictions for 3D printing of the particular item, and secure access controls preventing unauthorized access to 3D printing of the particular item, the description of the access restrictions indicating a maximum number of times that the user is permitted to print the selected item; and the 3D printer, the 3D printer being configured to:

authenticate that the user has acquired the particular item and validate that the access restrictions for 3D printing of the particular item do not restrict 3D printing of the particular item by the 3D printer, wherein validating includes:

the 3D printer obtaining, from the computing equipment, a count of a number of times that the user has already printed the selected item and verifying that the count obtained from the computing equipment does not exceed the maximum number;

in response to authenticating and validating, construct the particular item using the description of 3D geometry of the particular item;

in response to completing constructing the particular item, inspect the particular item as constructed; and communicate inspection results to the computing equipment;

wherein the computing equipment is further configured to determine that the inspection results indicate that the particular item as constructed by the 3D printer meets quality assurance standards indicative of successful completion of printing the particular item, and, in response, increment the count of the number of times that the user has already printed the selected item.

6. The system of claim 5 wherein:

the description of the access restrictions indicates an allowable period of time during which the user is permitted to print the selected item; and validating further includes:

the 3D printer communicating with the computing equipment to obtain a current time from the computing equipment; and verifying that the current time obtained from the computing equipment is within the allowable period of time.

7. The system of claim 5 wherein the 3D printer includes laser scanning equipment configured to perform a laser scan of the particular item as constructed by the 3D printer as part of inspecting the particular item as constructed by the 3D printer.

8. The system of claim 5 wherein the 3D printer is further configured to, while constructing the particular item, send progress updates from the 3D printer to the computing equipment for display to the user.

9. A computer program product comprising a non-transitory computer-readable storage medium storing a set of instructions, which, when executed by a computing device, cause the computing device to:

display a list of items available for 3-dimensional (3D) printing to a user;

receive a selection from the user of a particular item from the list of items;

authenticate an acquisition of the particular item by the user; and send, to a 3D printer of the user, a secure 3D print file, the secure 3D print file including a description of 3D geometry of the particular item, a description of access restrictions for 3D printing of the particular item, and secure access controls preventing unauthorized access to 3D printing of the particular item, the description of the access restrictions indicating a maximum number of times that the user is permitted to print the selected item;

wherein the 3D printer is configured to:

authenticate that the user has acquired the particular item and validate that the access restrictions for 3D printing of the particular item do not restrict 3D printing of the particular item by the 3D printer, wherein validating includes:

obtaining, from the computing device, a count of a number of times that the user has already printed the selected item and verifying that the count obtained from the computing device does not exceed the maximum number;

in response to authenticating and validating, construct the particular item using the description of 3D geometry of the particular item;

in response to completing constructing the particular item, inspect the particular item as constructed; and communicate inspection results to the computing device;

the instructions, when executed by the computing device, further cause the computing device to, in response to determining that the inspection results indicate that the particular item as constructed by the 3D printer meets quality assurance standards indicative of successful completion of printing the particular item, increment the count of the number of times that the user has already printed the selected item.

10. The computer program product of claim 9 wherein:

the description of the access restrictions indicates an allowable period of time during which the user is permitted to print the selected item; and validating further includes:

the 3D printer communicating with the computing device to obtain a current time from the computing device; and verifying that the current time obtained from the computing device is within the allowable period of time.

11. The computer program product of claim 9 wherein the 3D printer is further configured to, while constructing the particular item, send progress updates from the 3D printer to the computing device for display to the user.

* * * * *